(12) United States Patent
Seno et al.

(10) Patent No.: US 10,738,184 B2
(45) Date of Patent: *Aug. 11, 2020

(54) SAPONIFIED ETHYLENE-VINYL ESTER COPOLYMER PELLET AND METHOD FOR PRODUCING SAME

(71) Applicant: THE NIPPON SYNTHETIC CHEMICAL INDUSTRY CO., LTD., Osaka (JP)

(72) Inventors: Ryuta Seno, Osaka (JP); Shinichi Hori, Osaka (JP); Nobuaki Sato, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 15/773,017

(22) PCT Filed: Oct. 27, 2016

(86) PCT No.: PCT/JP2016/081844
§ 371 (c)(1),
(2) Date: May 2, 2018

(87) PCT Pub. No.: WO2017/082063
PCT Pub. Date: May 18, 2017

(65) Prior Publication Data
US 2018/0319965 A1 Nov. 8, 2018

(30) Foreign Application Priority Data

Nov. 13, 2015 (JP) .................. 2015-222904

(51) Int. Cl.
*B29B 9/16* (2006.01)
*C08J 3/20* (2006.01)
*C08K 5/00* (2006.01)
*C08K 5/01* (2006.01)
*C08K 5/09* (2006.01)
*C08K 5/098* (2006.01)
*C08K 5/101* (2006.01)
*C08L 23/08* (2006.01)
*C08L 29/04* (2006.01)
*B29B 9/12* (2006.01)
*C08F 36/14* (2006.01)
*C08F 210/02* (2006.01)
*C08F 218/08* (2006.01)
*B29B 9/06* (2006.01)

(52) U.S. Cl.
CPC ............ *C08L 23/0861* (2013.01); *B29B 9/12* (2013.01); *B29B 9/16* (2013.01); *C08F 36/14* (2013.01); *C08F 210/02* (2013.01); *C08F 218/08* (2013.01); *C08J 3/20* (2013.01); *C08K 5/01* (2013.01); *C08K 5/09* (2013.01); *C08K 5/098* (2013.01); *C08K 5/101* (2013.01); *C08L 29/04* (2013.01); *B29B 9/06* (2013.01); *B29B 2009/161* (2013.01); *B29B 2009/168* (2013.01); *C08F 2500/17* (2013.01); *C08F 2800/20* (2013.01); *C08K 5/005* (2013.01)

(58) Field of Classification Search
CPC . C08K 5/005; C08K 5/01; C08K 5/09; C08K 5/098; C08K 5/101; C08L 23/0861; C08L 29/04; C08F 218/08; C08F 210/02; C08F 2800/20; C08F 2500/17
See application file for complete search history.

(56) References Cited

U.S. PATENT DOCUMENTS

| | | | |
|---|---|---|---|
| 2004/0204549 A1 | 10/2004 | Yoshimi et al. |
| 2012/0248640 A1 | 10/2012 | Tsuboi et al. |
| 2013/0040087 A1 | 2/2013 | Kazeto et al. |
| 2015/0041462 A1 | 2/2015 | Nakazawa et al. |
| 2015/0105508 A1 | 4/2015 | Nakazawa et al. |
| 2015/0159005 A1 | 6/2015 | Nakazawa et al. |
| 2016/0243746 A1 | 8/2016 | Kawai |
| 2016/0251500 A1 | 9/2016 | Kawai |

FOREIGN PATENT DOCUMENTS

| | | |
|---|---|---|
| CN | 104220518 A | 12/2014 |
| JP | H09-71620 A | 3/1997 |
| JP | 2003-89706 A | 3/2003 |
| TW | 201343685 | 11/2013 |
| WO | 2013/146961 A | 10/2013 |
| WO | 2013/146962 A | 10/2013 |
| WO | 2015/050221 A | 4/2015 |
| WO | 2015/050222 A | 4/2015 |

OTHER PUBLICATIONS

Extended European Search Report issued with respect to Application No. 16864027.4, dated May 2, 2019.
Written Opinion issued with respect to Singapore Application No. 11201803443P, dated May 13, 2019.
International Search Report issued in PCT/JP2016/081844, dated Dec. 6, 2016.
International Preliminary Report on Patentability issued in PCT/JP2016/081844, dated May 15, 2018.
Notice of Reasons for Refusal issued in JP Application No. 2016-567428 dated Feb. 20, 2020, English translation.

(Continued)

*Primary Examiner* — Irina S Zemel
*Assistant Examiner* — Jeffrey S Lenihan
(74) *Attorney, Agent, or Firm* — Greenblum & Bernstein, P.L.C.

(57) ABSTRACT

Provided is an EVOH resin pellet which is capable of reducing the occurrence of fish eyes in a melt molded article of an EVOH resin. The occurrence of fish eyes in a melt molded article such as a film that is produced by melt molding using pellets is able to be suppressed by setting the abundance of a conjugated polyene in a surface portion of the pellet to an intended amount or more.

9 Claims, No Drawings

(56) References Cited

OTHER PUBLICATIONS

CN Office Action issued in CN Patent App. No. 201680065544.3 dated Apr. 1, 2020, English translation.
Notification of Examination opinions, Taiwan Patent Office, Application No. 105136184, dated May 5, 2020, with English translation thereof.

SAPONIFIED ETHYLENE-VINYL ESTER COPOLYMER PELLET AND METHOD FOR PRODUCING SAME

TECHNICAL FIELD

The present invention relates to a saponified ethylene-vinyl ester-based copolymer (hereinafter, referred to as "EVOH resin") pellet which can be formed into a film with reduced occurrence of fish eyes, in particular, relates to an EVOH resin pellet which is adjusted in an abundance of conjugated polyene in a surface portion of the pellet, and a method for producing the pellet.

BACKGROUND ART

EVOH resin can exhibit superior excellent gas-barrier performance such as oxygen-barrier performance due to the fact that hydrogen bond is formed between hydroxyl groups in the molecular chain of the EVOH resin to form a crystal part which can prevent oxygen from intruding. For this gas barrier performance, EVOH resin is molded into a film or sheet used as a wrapping material for food, pharmaceuticals, industrial medicine and agrochemicals, or container such as bottle.

In general, molding EVOH resin into film, sheet, bottle, cup, tube, or pipe is performed by melt-molding. The resulting molded article is processed for actual use. Therefore moldability and processability are important properties for EVOH resin.

Since EVOH resin has a relatively active hydroxyl group in its molecule, the EVOH resin in a molten state under high temperatures may be oxidized or crosslinked to generate a deteriorated matter because of heat. It is known that the deteriorated matter may result in gel or bump which brings out fish eye associated with a defect of the molded article.

A patent document 1 suggests an EVOH resin composition comprising EVOH resin and a conjugated polyene, as an EVOH resin composition which is reduced in the occurrence of fish eyes, gel and/or bump when melt-molding.

According to the method disclosed in the patent document 1, a conjugated polyene having a boiling point of 20° C. or more is added to the copolymer of vinyl acetate or a like monomer, followed by saponifying the obtained copolymer. The obtained EVOH resin composition comprises an EVOH resin and the conjugated polyene wherein the concentration of the conjugated polyene is from 0.00002 to 1 wt % (i.e. 0.02 ppm to 10000 ppm), preferably 0.0001 to 0.2 wt % (i.e. 1 ppm to 2000 ppm) (paragraph 0034).

The patent document 1 describes that a polyene compound still remained in a final product after saponification was an origin of odor or exudation or the like, and therefore a relatively high residual amount is not good for wrapping material such as container. The patent document 1 also describes that a polyene compound which is readily removable by rinsing with water is recommended (paragraph 0011).

According to Example 1 of the patent document 1, EVOH resin was obtained by polymerizing vinyl acetate under a pressurized ethylene, thereafter adding conjugated polyene and removing ethylene, followed by saponification. Thus obtained EVOH resin particles were rinsed with a large amount of water to produce desired EVOH resin particles.

The patent document 1 shows in Table 1 that the EVOH resin particles could be formed into a film with less gel bumps each having a size of 100 µm or more, specifically from 3 to 10 of spots per area of 100 cm$^2$.

A patent document 2 also discloses a method of producing a vinyl alcohol-based polymer capable of reducing not only occurrence offish eyes in molding but also coloration and odor. The method comprises polymerizing vinyl acetate-based monomer, removing unreacted vinyl acetate from a distillation tower after the polymerization, and feeding a polymerization inhibitor which is at least one of N,N-dialkyl hydroxyl amine, styrene derivative, hydroquinone derivative, quinone derivative, piperidine derivative, or conjugated polyene.

[Patent document 1] JP H9-71620A
[Patent document 2] JP2003-89706A

DISCLOSURE OF THE INVENTION

Technical Problem to be Solved

As taught by the patent document 1, a specific amount of the conjugated polyene can suppress the occurrence of gel bumps in film as a molded article, but the mechanism is not clear.

Nowadays the requirement to a wrapping film has become strict. Therefore the film disclosed in Example of the patent document 1 was insufficiently satisfied, further improvement is required to a wrapping film for foods.

According to the method disclosed in the patent document 2, the EVOH resin produced by polymerization and saponification is extruded in a form of strand and pelletized by cutting, followed by rinsing with water. In thus produced EVOH resin pellets, a polymerization inhibitor added are inferred to still remain. However, the patent document 2 does not disclose a working example with use of conjugated polyene, and therefore is silent about the remained amount of the conjugated polyene.

Accordingly the patent document 2 does not teach a relationship between the remained amount of conjugated polyene and fish eyes occurred in molding.

The present invention was made under these situations, the object of the invention is to provide an EVOH resin pellet which may be formed into a molded article with almost no fish eyes of 200 µm or more in diameter and remarkably reduced fish eyes less than 200 µm in diameter.

Means for Solving the Problems

The inventors has studied about the relationship between the abundance of conjugated polyene in an EVOH resin pellet and suppression of the occurrence of fish eyes, and found that an amount of conjugated polyene adhered to in a surface portion of the pellet affected a suppression of the occurrence of fish eyes, and completed the invention.

A saponified ethylene-vinyl ester-based copolymer pellet of the invention comprises a saponified ethylene-vinyl ester-based copolymer and a conjugated polyene, wherein the amount of the conjugated polyene determined by a below method is 30 ppb or more:

20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene.

Preferably, a ratio of the amount (SC) of the conjugated polyene determined by the above-mentioned method to a total amount (TC) of the conjugated polyene contained in the saponified ethylene-vinyl ester-based copolymer pellet, (SC/TC), is 0.015% by weight or more.

The total amount (TC) of conjugated polyene contained in the saponified ethylene-vinyl ester-based copolymer pellet is preferably from 0.01 to 10000 ppm.

A preferable conjugated polyene may be at least one selected from the group consisting of sorbic acid, sorbic acid ester, and sorbic acid salt.

In another aspect of the invention, a method for producing a saponified ethylene-vinyl ester-based copolymer pellet is included. The method for producing a saponified ethylene-vinyl ester-based copolymer pellet comprises contacting a saponified ethylene-vinyl ester-based copolymer pellet with a treatment liquid containing a conjugated polyene to obtain a saponified ethylene-vinyl ester-based copolymer pellet in which an amount of conjugated polyene is 30 ppb or more measured by a method below:

20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene.

The above-mentioned method is a mere example of the method for producing the saponified ethylene-vinyl ester-based copolymer pellet of the invention. The saponified ethylene-vinyl ester-based copolymer pellet of the invention may be produced by another method other than that of the invention.

A preferable pellet of the saponified ethylene-vinyl ester-based copolymer to be subjected in the contacting process is a porous pellet.

Preferably the said saponified ethylene-vinyl ester-based copolymer pellet is a pellet produced by pelletizing an alcohol solution containing the ethylene-vinyl ester-based copolymer.

The producing method may further comprises adding a conjugated polyene as a polymerization inhibitor in production of ethylene-vinyl ester-based copolymer.

The treatment liquid may contain at least one selected from the group consisting of boron compound, acetic acid, and acetate.

It is no clear about a mechanism how an increase of the abundance of the conjugated polyene in a surface of the pellet suppresses the occurrence of fish eyes, however it is supposed as follows. The surfaces of pellets contact a heated metal of barrel or screw of an extruder when the pellets are molten by the extruder. In the case that the abundance of conjugated polyene in a surface portion is larger than that predetermined, the conjugated polyene could trap radical generated locally around the surface of the pellet and thereby suppressing the occurrence of fish eyes.

Accordingly the present invention also includes a use of the saponified ethylene-vinyl ester-based copolymer pellet for suppression of the occurrence of fish eyes in a molded article such as film of EVOH resin. The method for reducing fish eyes in a melt molded article of EVOH resin comprises employing either a plurality of saponified ethylene-vinyl ester-based copolymer pellets or mixture of the saponified ethylene-vinyl ester-based copolymer pellet and an optional other thermoplastic resin pellet as a raw material for the melt-molded article, wherein an amount of conjugated polyene in the saponified ethylene-vinyl ester-based copolymer pellet is 30 ppb or more measured by the below method:

20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene.

In the case that an inventive EVOH resin pellet having an intended amount of the conjugated polyene is needed to distinguish from an EVOH resin pellet not having an intended amount of the conjugated polyene. The former is called "EVOH resin pellet to which a conjugated polyene adheres". The latter, which is an EVOH resin pellet directly obtained after pelletizing, in other words, EVOH resin pellet provided without a treatment for adhering conjugated polyene, is called "EVOH resin pellet (prior to treatment)". A mere wording "EVOH resin pellet" includes both without distinguishing between the former and the latter.

Effect of the Invention

The EVOH resin pellets of the disclosure may be reduced in the occurrence of fish eyes in a molded article such as film made therefrom. Therefore the molded article would meet the strict requirement of late date which is associated with an appearance of wrapping film.

According to a producing method of the disclosure, the above-mentioned EVOH resin pellet, i.e. EVOH resin pellet to which a conjugated polyene adheres, may be produced with use of existing equipment.

MODE FOR CARRYING OUT OF THE INVENTION

Hereinafter, the present invention will be described, however the description shows merely one preferable embodiment and does not restrict the content of the invention.

A saponified ethylene-vinyl ester-based copolymer pellet of the disclosure (i.e. EVOH resin pellet to which a conjugated polyene adheres) comprises a saponified ethylene-vinyl ester-based copolymer and a conjugated polyene, wherein the amount of the conjugated polyene determined by a below method is 30 ppb or more:

20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene.

<EVOH Resin>

EVOH resin formed into the pellets is a water-insoluble thermoplastic resin and usually produced by saponifying a copolymer of ethylene and vinyl ester monomer, so-called ethylene-vinyl ester-based copolymer.

Vinyl acetate is commonly employed for the vinyl ester monomer from the viewpoint of commercial availability and efficiency of removing impurities generated in production. Employed may be a vinyl ester monomer other than vinyl acetate, for example, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, as well as aromatic vinyl esters such as vinyl benzoate. Commonly used is an aliphatic vinyl ester having from usually 3 to 20 carbon atoms, preferably 4 to 10 carbon atoms, particularly preferably 4 to 7 carbon atoms. These vinyl ester monomers may be used individually or in a combination thereof according to needs.

Ethylene as well as the above-mentioned vinyl ester monomer may be usually produced from a raw materials derived from petroleum such as naphtha. Raw materials derived from natural gas such as shale gas, raw material derived from plants such as sugar or starch contained in sugar cane, sugar beet, corn, and potato, and defecated materials derived from cellulose contained in rice, wheat, millet and other plant may be used as a raw material for those monomers.

The EVOH resin used in the invention may further contain a structural unit derived from the comonomer listed below in the range not inhibiting the effect of the invention, for example 10 mol % or less. The comonomer below is called "other comonomer".

Examples of the other comonomer include olefins such as propylene, 1-butene and isobutene; hydroxyl group-containing α-olefins such as 3-buten-1-ol, 3-butene-1,2-diol, 4-penten-1-ol, and 5-hexene-1,2-diol, or a derivative such as ester thereof and acylated product; unsaturated acids such as acrylic acid, methacrylic acid, crotonic acid, phthalic acid (or anhydride), maleic acid (or anhydride), itaconic acid (or anhydride) or salt thereof, or mono- or di-alkyl ester having from 1 to 18 carbon atoms in the alkyl group; acrylamides such as acrylamide, N-alkyl acrylamide having from 1 to 18 carbon atoms in the alkyl group, N,N-dimethylacrylamide, 2-acrylamide propanesulfonic acid or salt thereof, and acrylamide propyl dimethylamine or salt thereof or quaternary salt thereof; methacrylamides such as methacrylamide, N-alkylmethacrylamide having from 1 to 18 carbon atoms in the alkyl group, N,N-dimethylmethacrylamide, 2-methacrylamide propanesulfonic acid or salt thereof, and methacrylamide propyl dimethylamine or salt thereof or quaternary salt thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether having from 1 to 18 carbon atoms in respective alkyl group; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol and dimethoxy allyl alcohol; trimethyl-(3-acrylamide-3-dimethylpropyl)-ammonium chloride, acrylamide-2-methylpropanesulfonic acid and so on.

Copolymerization of ethylene and vinyl ester-based monomer, optionally other comonomer, may be conducted by a known polymerization method including solution polymerization, suspension polymerization, emulsion polymerization, and bulk polymerization. Copolymerization may be conducted either in continuous operation or batch operation. Solution polymerization is commonly employed from the viewpoint of homogenous dispersion.

The solution polymerization is usually conducted by charging vinyl ester monomer solution together with a polymerization catalyst into a polymerization vessel, and initiating a polymerization with supplying pressurized ethylene under the condition of heating and stirring the solution. The pressure of ethylene is commonly between 20 and 80 kg/cm$^2$.

An alcohol is preferably used for a solvent of the vinyl ester monomer solution. An organic solvent which can dissolve ethylene, vinyl acetate and ethylene-vinyl acetate copolymer may be used. The organic solvent other than alcohol is dimethyl sulfoxide and so on. Examples of the alcohols include methyl alcohol, ethyl alcohol, propyl alcohol, n-butyl alcohol, t-butyl alcohol, and other aliphatic alcohol having from 1 to 10 carbon atoms. Of these, methyl alcohol is particularly preferred.

For a catalyst used in the solution copolymerization a known radical polymerization catalyst may be used. Preferable radical polymerization catalyst may be azonitrile-based initiator and organic peroxide-based initiator, for example, azo-based compounds such as 2,2'-azobis-(2,4-dimethylvaleronitrile), 2,2'-azobis-(2,4,4-trimethylvaleronitrile), 2,2'-azobisisobutyronitrile, 2,2'-azobis(4-methoxy-2,4-dimethylvaleronitrile), and 2,2'-azobis-(2-methylisobutyrate); alkylperesters such as t-butyl peroxyneodecanoate, t-butyl peroxypivalate, and t-butylperoxy-2-ethyl hexanoate; peroxydicarbonates such as bis(4-t-butylcyclohexyl)peroxydicarbonate, dicyclohexylperoxydicarbonate, bis(2-ethylhexyl)di-sec-butylperoxydicarbonate, and diisopropylperoxy-dicarbonate; peroxide such as acetylperoxide, benzoylperoxide, lauroylperoxide, dilauroylperoxide, didecanoylperoxide, dioctanoylperoxide, and dipropylperoxide. In the case of using a catalyst having a short half-life, the catalyst should be supplied in continuous operation but not batch operation.

A common copolymerization temperature is selected from the range of 20 to 90° C., preferably 40° C. to 70° C. A common polymerization time is selected from the range of 2 to 15 hours, preferably 3 to 11 hours. In the case of continuous polymerization system, the polymerization time is preferably almost the same as the average residence time in the polymerization vessel.

The solution polymerization is terminated at the time that the polymerization rate arrives at a predetermined rate. The desirable polymerization rate is in the range of usually 10 to 90 mol %, preferably 30 to 80 mol %, based on the amount of given vinyl ester. The amount of resin in the solution after the polymerization is in the range of usually 5 to 85 wt %, preferably 20 to 70 wt %.

The termination of polymerization is usually performed by adding a polymerization inhibitor. Examples of the polymerization inhibitor include N,N-dialkyl hydroxyl amine, styrene derivative, hydroquinone derivative, quinone derivative, piperidine derivative, and conjugated polyene. Of these, a conjugated polyene is preferably used. A residue of the conjugated polyene could contribute to suppress the occurrence of fish eyes in relation to its amount contained in a surface portion of the pellet.

For the conjugated polyene used for the polymerization inhibitor, compounds listed later for the conjugated polyene to be contained in the surface portion of the pellet.

In an embodiment, conjugated polyene is added in a form of solution in which conjugated polyene is dissolved in a solvent used in polymerization for EVOH resin because the conjugated polyene may be homogenously diffused.

In the case of adding a conjugated polyene as a polymerization inhibitor, the amount may be selected from the range of about 0.0001 to 3 wt %, preferably 0.0005 to 1 wt %, more preferably 0.001 to 0.5 wt % based on the amount of vinyl ester monomer to be charged.

The saponification of the resultant copolymer is conducted after removing ethylene gas and vinyl ester monomer remained unreacted.

After removing ethylene by its evaporation, vinyl ester which is remained unreacted is further removed from the ethylene-vinyl ester copolymerization system by, for example, a method that the ethylene-vinyl ester copolymer solution is continuously fed at a constant rate from an upper portion of a tower filled with Raschig rings while gaseous organic solvent such as methanol is blown from bottom of the tower, and thereby allowing a distillate of mixed gas of the gaseous organic solvent and vinyl ester remained unreacted to flow out of the top. A final copolymer solution substantially free from the vinyl ester residue can be taken out from the bottom of the tower.

Saponification of the ethylene-vinyl ester-based copolymer may be conducted by a known method. In general, the saponification reaction is initiated by adding alkali catalyst to the ethylene-vinyl ester-based copolymer solution after removing the vinyl ester monomer residue. The saponification reaction may be carried out in a continuous process or batch process.

For the catalyst for saponification, an alkali catalyst such as sodium hydroxide, potassium hydroxide, or alkali metal alcoholate may be employed.

The conditions of the saponification are selected depending on catalyst, content rate of ethylene unit in the ethylene-vinyl ester-based copolymer, target saponification degree and so on. For example, an appropriate condition in the case of batch process is shown below.

The concentration of ethylene-vinyl ester-based copolymer in the solution is preferably selected from the range of 10 to 50 wt %.

A preferable saponification reaction temperature is commonly selected from the range of 30 to 60° C., the amount of the catalyst for saponification is commonly selected from the range of 0.001 to 0.6 equivalent (to vinyl ester group). The saponification time may be selected from the range of 1 to 6 hours, depending on the condition of saponification and target saponification degree.

For the EVOH resin solution thus obtained, alcohol such as methanol or water/alcohol mixed solution is preferably employed.

In addition, a post-modified EVOH resin by urethanation, acetalization, cyanoethylation, or oxyalkylenation may be employed for the EVOH resin used in the disclosure.

Thus obtained EVOH resin contains vinyl alcohol unit and a structural unit derived from ethylene, both as main units, and a small amount of vinyl ester structural unit as remained unreacted unit. In case that other comonomer is copolymerized, the comonomer-derived structural unit may be further contained.

According to the invention, an EVOH resin having the composition below is preferably employed.

The content rate of ethylene unit in the EVOH resin is in the range of usually 20 to 60 mol %, preferably 25 to 50 mol %, particularly preferably 25 to 35 mol %, as a measurement value in accordance with ISO14663. If the content rate of ethylene unit is unduly low, the gas-barrier performance under a high humidity condition and melt-molding property tends to be lowered. If the content rate of ethylene unit is unduly high, insufficient gas-barrier performance might be imparted.

The saponification degree of the vinyl ester component in the EVOH resin is in the range of usually 90 to 100 mol %, preferably 95 to 100 mol %, particularly preferably 99 to 100 mol %, as a measurement value in accordance with JIS K6726 with the proviso that EVOH resin is dissolved homogenously in a mixed solvent of water and methanol. If the saponification degree is unduly low, the gas-barrier performance, thermostability, and humidity resistance tend to be lowered.

<Production of EVOH Resin Pellet (Prior to Treatment)>

The above-mentioned EVOH resin may be formed into pellet by a conventionally known method. Examples of the method include a) hot-cut pelletizing process and b) strand cut pelletizing process. The hot-cut pelletizing process is conducted by extruding molten EVOH resin from the outlet and cutting the extrudate, followed by cooling and solidifying. The strand cut pelletizing process is conducted by extruding a solution or slurry containing EVOH resin into a chamber for cooling and solidification to obtain EVOH resin strand and cutting the strand at an interval.

EVOH resin solution as for the raw material of the pellet to be fed into an extruder may be an EVOH resin solution directly obtained after saponification or a hydrous EVOH resin composition having an appropriately adjusted composition. In the case of the hydrous EVOH resin composition, the composition employs a solvent chosen from alcohol and a mixture of water and alcohol, preferably a mixture of water and alcohol. A preferable weight ratio of water to alcohol, i.e. water/alcohol is from 80/20 to 5/95. In the case of using a mixture of water and alcohol, the obtained pellet may be a porous pellet of EVOH resin.

A method of adjusting content rate of water in the hydrous EVOH resin composition used for the production of pellets is not limited. In the case of increasing content rate of water, spraying water into resin, immersing resin in water, contacting resin with vaporized water or the like operation may be carried out. In the case of decreasing the content rate of water, appropriately drying, for example, with use of hot air ventilation dryer or hot air fluidized bed dryer, may be carried out.

Among the above-mentioned EVOH resin pellet (prior to treatment), a porous pellet is preferably employed from the viewpoint of efficiency in the treatment for containing the conjugated polyene described later.

The shape of the pellets used in the disclosure is not limited. The individual pellet may have a shape such as sphere, column, cube, cuboid, and so on, depending on the production process thereof. When it comes to the size of pellet, a typical columnar pellet individually has a diameter of 1 to 6 mm, preferably 2 to 5 mm, and length of 1 to 6 mm, preferably 2 to 5 mm.

When it comes to a raw material of the pellet, either EVOH resin solution after the saponification or hydrous EVOH resin composition having appropriately adjusted content rate of water contains alkali catalyst used in saponification, by-produced salts, impurities and so on. In the case that such EVOH resin solution is used as a raw material for pellet, the obtained EVOH resin pellet (prior to treatment) usually contains the above-mentioned impurities. Accordingly thus obtained porous pellet may be allowed to rinse with water.

In the case that the pellet is rinsed with water, the polyene added as a polymerization inhibitor would be removed. The removability of polyene compound is varied with polarity thereof, however polyene may still remain at a constant rate in the saponified product.

<Conjugated Polyene>

The conjugated polyene compound is a compound containing conjugated double bond which is a structure alternating carbon-carbon double bond and carbon-carbon single bond and has two or more carbon-carbon double bonds. The conjugated polyene includes conjugated diene consisting of one single and two double carbon-carbon bonds; conjugated triene consisting of two single and three double carbon-carbon bonds; and conjugated polyene consisting of more than two single and more than three double carbon-carbon bonds. A conjugated polyene containing more than 8 conjugated double carbon-carbon bonds is almost enough to color the resulting molded article. For this reason, a conjugated polyene containing 7 or less conjugated double bonds is preferably used. In the case of containing a plurality of conjugated double bonds in a molecule, a plurality of conjugated double bonds may not be conjugated from each other. For example, tung oil, which contains three conjugated trienes in the molecule, is included in the conjugated polyene compound.

The conjugated polyene may be conjugated diene having two carbon-carbon double bonds, conjugated triene having three carbon-carbon double bonds, or conjugated polyene having 4 or more carbon-carbon double bonds. Examples of the conjugated diene include isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid ester, sorbate, abietic acid. Examples of the conjugated triene include 1,3,5-hexatriene, 2,4,6-octatriene-1-carboxylic acid, eleostearic acid, tung oil, cholecalciferol. Examples of the conjugated polyene include cyclooctatetraene, 2,4,6,8-decatetraene-1-carboxylid acid, retinol, and retinoic acid. In the case that the conjugated polyene such as 1,3-pentadiene, myrecene, and farnesene have some stereoisomers, any stereoisomer may be employed. A combination of two or more polyene compounds may also employed. Another compound other than the polyene compound may be added together with the polyene.

Of these, at least one selected from the group consisting of sorbic acid, sorbic acid ester, and sorbic acid salt is preferably used because they are widely utilized as an food additive in industry and excellent in health when being used for wrapping material for food, and moreover commercially availability. Both of sorbic acid and sorbic acid salt contain carboxyl group and therefore exhibit high affinity with water, which makes it easy to adjust the amount adhered to a surface of the resin pellet.

The EVOH resin pellet used in the disclosure, i.e. EVOH resin pellet to which a conjugated polyene adheres, has 30 ppb or more, preferably 34 ppb or more, further more preferably 38 ppb or more of conjugated polyene in terms of an amount of conjugated polyene contained in the analyte liquid prepared by putting 20 g of EVOH resin pellets in 30 mL of mixture of water and methanol (ratio of water/methanol=1/1 in volume) and agitating for 10 minutes at room temperature. The amount determined by above method is an amount (SC) of conjugated polyene contained in a surface portion of the EVOH resin pellet. The inventors have found that the amount of conjugated polyene contained in a surface of the EVOH resin pellet, SC, is effective for suppressing the occurrence of fish eyes. The amount of SC is adjusted to 30 ppb or more, preferably 34 ppb or more, more preferably 38 ppb or more, thereby effectively suppressing the occurrence of minute fish eyes having a diameter less than 200 µm. On the contrary, unduly small amount (SC) of conjugated polyene contained in a surface portion of pellet causes to increase fish eyes.

Some conjugated polyenes are water-poorly soluble or alcohol-poorly soluble compound. However, the use of a mixture of water and methanol having a ratio of water/methanol=1/1 as an extracting solvent may achieve to dissolve such conjugated polyenes. For this reason, in the case of using a combination of two or more of conjugated polyenes, a plurality of conjugated polyenes are extracted. Accordingly, the amount determined by the use of the analyte liquid corresponds to a total amount of a plurality of conjugated polyenes. The above range is applied to a total amount of conjugated polyenes.

The method of quantitative determination of an amount of conjugated polyene contained in analyte liquid is carried out by, for example, LC-UV method, but not limited thereto.

The upper limit of the amount of conjugated polyene in a surface portion (SC), is usually 300000 ppb (300 ppm), preferably 25000 ppb (25 ppm), more preferably 10000 ppb (10 ppm), furthermore preferably 8000 ppb (8 ppm), particularly preferably 5000 ppb (5 ppm).

In the EVOH resin pellet of the disclosure, i.e. EVOH resin pellet to which a conjugated polyene adheres, an ambulance of conjugated polyene in a surface portion of the pellet (SC) is 30 ppb or more as a value determined by the above-mentioned method. An EVOH resin pellet containing almost no conjugated polyene in inner portion thereof as well as an EVOH resin pellet containing more conjugated polyene in inner portion thereof than a surface portion thereof may be included in the EVOH resin pellets used in the invention.

Similar to the case of addition of a conjugated polyene as a polymerization inhibitor, in the case of using EVOH resin solution or hydrous EVOH resin composition as a raw material for pellets, the amount of conjugated polyene held in inner portion of the pellet tends to be higher.

In the case of containing conjugated polyene in inner portion of the EVOH resin pellet to which a conjugated polyene adheres, the total amount (TC) of conjugated polyene held in whole pellet is preferably from 0.000001 to 1 wt % (0.01 to 10000 ppm), more preferably 0.00001 to 0.8 wt % (0.1 to 8000 ppm), further more preferably 0.0001 to 0.5 wt % (1 to 5000 ppm), particularly preferably 0.0001 to 0.2 wt % (1 to 2000 ppm). Unduly low total amount (TC) leads to lessen the amount in a surface portion (SC) of the pellet proportionally, which may cause to increase fish eyes. Unduly high total amount (TC) may cause coloration in a molded article based on the color of the conjugated polyene itself.

The ratio of the amount of conjugated polyene in a surface portion (SC) to a total amount (TC) in EVOH resin pellet, (SC/TC×100), is 0.015 wt % or more, preferably 0.02 wt % or more, more preferably 0.025 wt % or more. Unduly low rate of the amount contained in a surface portion may not sufficiently suppress the occurrence of fish eyes. The upper limit of the rate in a surface portion is usually 55 wt %, preferably 10 wt %, more preferably 5 wt %, further more preferably 3 wt %, particularly preferably 1 wt %.

<Other Ingredient>

The EVOH resin pellet may optionally contain an additive conventional for EVOH resin. Examples of the additive include heat stabilizer, antioxidant, antistatic agent, colorant, ultraviolet absorber, lubricant, plasticizer, light stabilizer, surfactant, insecticide, drying agent, antiblocking agent, fire retardant, crosslinking agent, curing agent, foaming agent, crystal forming agent, anti-fogging agent, biodegradable agent, silane coupling agent, oxygen scavenger, filler, reinforcement including a various fibers. Acids such as phosphoric acid, pyrophosphoric acid, phosphorous acid, oxalic acid, succinic acid, adipic acid, tartaric acid, citric acid, and acetic acid, and a partial salt of polybasic acid such as disodium hydrogenphosphate and dipotassium hydrogenphosphate.

<Process for Adhering Conjugated Polyene to Pellet>

A method of increasing an ambulance of conjugated polyene in a surface portion of EVOH resin pellet to 30 ppb or more, which corresponds to a method for producing the EVOH resin pellet of the invention, comprises contacting a saponified ethylene-vinyl ester-based copolymer pellet (prior to treatment) obtainable by the above method with a treatment liquid containing a conjugated polyene.

The process of contacting the EVOH resin pellet (prior to treatment) prepared in advance with a solution containing a conjugated polyene may be carried out by spraying an aqueous solution containing a conjugated polyene against EVOH resin pellet (prior to treatment); dipping EVOH resin pellet (prior to treatment) into aqueous solution containing a conjugated polyene; rinsing EVOH resin pellet (prior to treatment) with aqueous solution containing a conjugated polyene; coating the EVOH resin pellet (prior to treatment) with a conjugated polyene by spraying the solution that a conjugated polyene is dissolved in solvent against the pellet; and a combination of one or more these operations. Of these, the dipping operation and the rinsing operation are preferred.

Besides such contacting process that the EVOH resin pellet prepared in advance contacts with conjugated polyene, treatment for adhering conjugated polyene in a surface of the EVOH resin pellet may be achieved during the production of the pellet. For example, an aqueous solution containing conjugated polyene may be employed for a cooling liquid in pelletizing process.

As a process for containing a conjugated polyene in EVOH resin pellet during the production of the pellet, addition of the conjugated polyene to a raw material for pellets (e.g. hydrous EVOH resin composition and EVOH resin solution) may be employed. Since a conjugated polyene may be employed for a polymerization inhibitor, the conjugated polyene may be added for ceasing the polymerization of the EVOH resin, thereby obtaining EVOH resin pellet made from the EVOH resin containing the conjugated polyene.

Thus produced EVOH resin pellets contain conjugated polyene almost homogeneously in the whole of individual pellet. This means the amount (SC) of conjugated polyene contained in a surface portion of the pellet tends to be a relatively low. Increasing the amount of conjugated polyene to be added as a polymerization inhibitor may result in coloration of the obtained pellet which needs to be rinsed with water after pelletization. For these reasons, a mere addition of a conjugated polyene during the production of pellets is commonly hard to increase the amount (SC) of the conjugated polyene in a surface portion of pellet up to a sufficient amount for suppressing the occurrence of fish eyes.

In this respect, the inventive method for producing a pellet comprising contacting EVOH resin pellet (prior to treatment) with a treatment liquid containing a conjugated polyene makes possible to increase the amount of conjugated polyene in a surface portion of the pellet.

The process for adhering conjugated polyene by contacting EVOH resin pellet (prior to treatment) with treatment liquid containing the conjugated polyene has an advantageous effect, in addition to the increase of the amount (SC) of the conjugated polyene contained in a surface portion of the pellet. The advantageous effect is that the amount (SC) of conjugated polyene contained in a surface portion of the pellet can be precisely controlled by adjusting the concentration of conjugated polyene contained in the treatment liquid.

Moreover, the treatment for adhering conjugated polyene by contacting EVOH resin pellet (prior to treatment) with treatment liquid containing conjugated polyene, may also function as a process for adjusting the amount of another additive such as acetic acid, acetate, or a boron-containing compound such as boric acid. For this process, a rinsing liquid containing conjugated polyene as well as the additive (e.g. acetic acid, acetate, or boron-containing compound such as boric acid). By such process, adjustment of the amount ratio of the conjugated polyene to the additive is readily performed.

The concentration of conjugated polyene in aqueous solution for the contacting process is chosen dependent on the contacting operation. A typical concentration is in the range of 0.01 to 60000 ppm, preferably 0.03 to 10000 ppm, more preferably 0.05 to 500 ppm, further more preferably 0.1 to 50 ppm. Unduly low concentration may be hard to increase the amount (SC) of conjugated polyene in a surface portion of the pellet up to the intended amount. Unduly high concentration may make the amount (SC) of conjugated polyene contained in a surface portion and the total amount (TC) of conjugated polyene contained in the pellet both too large, which may result in the occurrence of gel bump or the like. To make matters worse, conjugated polyene may deposit and adheres to a surface of the pellet, which aids to create agglomerate capable of appearing in a film as a molded article from the pellets.

The amount (SC) of conjugated polyene contained in a surface portion of the pellet may be controlled in the process of contacting with aqueous solution containing a conjugated polyene, by choosing concentration of conjugated polyene contained in the aqueous solution, contacting time (spraying period in the case of spraying), temperature during the contacting process, agitating speed during the contacting process, water content rate of the EVOH resin pellet to be treated.

After the process of contacting with a conjugated polyene, drying pellets is preferably conducted. The drying operation may be carried out by a known method such as a flow drying system with use of cylinder/channel type mixing dryer, cylindrical dryer, rotary dryer, fluidized bed dryer, vibration fluidized bed dryer, or cone rotary dryer; and a static drying system with use of batch box type dryer, band dryer, tunnel dryer, or vertical silo dryer. Blowing gas such as nitrogen gas having a temperature of 80 to 150° C. into a dryer can improve efficiency of drying.

Thus obtained EVOH resin pellet has a melt flow rate (MFR) (210° C., load of 2160 g) of appropriately 0.2 to 400 g/10 minutes, more appropriately 0.4 to 200 g/10 minutes. Unduly high MFR tends to be unstable in film production from the pellets. Unduly low MFR leads to unduly high viscosity of the molten EVOH resin, resulting in difficult melt-extruding operation.

<Use>

The EVOH resin pellets of the invention may be formed into film, sheet, cup or bottle by melt-molding. The melt-molding method includes extrusion molding (T-die extrusion, blown film extrusion, blow molding, melt spinning, contour extrusion etc.), injection molding and the like. The melt-molding temperature is selected from the range of usually 150 to 300° C. The obtained film or sheet may be uniaxially or biaxially stretched.

The EVOH resin pellet (conjugated polyene-holding EVOH resin pellet) disclosed in this specification may be directly supplied to melt-molding without addition or modification. The EVOH resin pellet may be combined with other thermoplastic resin pellet according to needs. A mixture of two or more kinds of conjugated polyene-holding EVOH resin pellets may be employed instead of a single kind of EVOH resin pellets. The mixture is a combination of EVOH resin pellets differing in their ethylene unit content rate, saponification degree, MFR, or constituent monomer.

Examples of other thermoplastic resin include a variety of polyolefin (for example polyethylene, polypropylene, poly-1-butene, poly-4-methyl-1-pentene, ethylene-propylene copolymer, copolymer of ethylene and α-olefin (having 4 or more carbon atoms), copolymer of polyolefin and maleic anhydride, ethylene-vinyl acetate copolymer, ethylene-acrylic acid ester copolymer, or these graft-modified with unsaturated carboxylic acid or derivative thereof (i.e. modified polyolefin), a variety of nylons (for example nylon 6, nylon 66, and nylon 6/66 copolymer), polyvinyl chloride, polyvinylidene chloride, polyester, polystyrene, polyacrylonitrile, polyurethane, poly acetal and modified polyvinyl alcohol resin.

A film of EVOH resin or a composition comprising an EVOH resin and other thermoplastic resin, made from the EVOH resin pellets of the disclosure as a raw material, may be laid over other thermoplastic resin film or coextruded with other kind of thermoplastic resin to produce a multi-layered film. The EVOH resin composition may be coextruded with a substrate such as paper, plastic film and metal foil, thereby coating the substrate with the EVOH resin composition. Alternatively a solution of the EVOH resin composition may be applied to the substrate for coating.

Thus obtained EVOH resin molded article such as film, sheet, stretched film, and container made from a stretched film such as bag, cup, tray, tube, bottle, and cover is excellent in appearance because of almost no coloration and very few fish eyes. Accordingly such molded article may be preferably used as a wrapping material meeting the strict requirement for gas-barrier property as well as appearance, for example, wrapping material or container for general food as well as condiment such as mayonnaise, dressing, fermented food such as miso, oil and fat food such as salad oil, beverages, cosmetics, pharmaceutical preparations, and the like.

EXAMPLE

The invention will be specifically explained with examples below, but these examples do not limit the invention as long as it does not exceed the gist of the invention.

The term "part(s)" in Examples is on the basis weight unless otherwise indicated.

<Measurement and Evaluation Method>
(1) Preparation of the Analyte Solution for Determining Total Amount (TC) of Conjugated Polyene Contained in Pellet EVOH resin pellet were frozen and pulverized to powder. 1 g of the powder and 8 mL of solvent for extraction (distilled water:methanol=1:1 in volume ratio) were put in a measuring flask (10 mL) and extracted in ultrasound bath for 60 minutes. The solvent for extraction was further added in the measuring flask up to 10 mL. Thereafter the obtained solution was filtrated with filter having a pore size of 0.45 μm to obtain an analyte solution for determining TC.

(2) Preparation of Analyte Solution for Determining Amount (SC) of Conjugated Polyene Contained in a Surface Portion of Pellet 20 g of EVOH resin pellets were supplied for extraction with solvent (distilled water:methanol=1:1 in volume ratio). The extraction is conducted by agitating the EVOH resin pellets in 30 mL of the solvent at room temperature for 10 minutes. The obtained solution was concentrated up to 2 mL and filtrated with a filter having a pore size of 0.45 μm. The obtained filtrate was used as an analyte solution for determining SC.

(3) Quantitative Determination of Conjugated Polyene

The above prepared analyte for quantitative determination of the amount of conjugated polyene was analyzed by LC-UV analysis under the conditions below. The amount of the conjugated polyene (sorbic acid or sodium sorbate) was determined based on the values of detected peak area and the calibration curve of the standard solution prepared below.

[Preparation of Calibration Curve]

Weighing 50 mg of sodium sorbate in 50 mL of measuring flask and dissolving it in methanol-ultra pure water mixed solvent (ratio of methanol:ultra-pure water=50:50) were carried out to prepare 50 mL solution as an original standard solution having a concentration of 1000 μg/mL. This original standard solution was diluted with the methanol-ultra pure water mixed solvent step by step to prepare a plurality of standard solutions differing in their concentration. A calibration curve was created by conducting LC-UV analysis of these standard solutions.

Thus created calibration curve was also utilized in the case of employing sorbic acid as a conjugated polyene. Since the signal intensity for one molecule of sorbic acid is identical to that of sodium sorbate, the amount of the sorbic acid was computed by multiplying the value of molecular weight of sorbic acid divided by molecular weight of sodium sorbate.

[Conditions for LC-UV Analysis]
LC system: Agilent 1260/1290 (Agilent)
Ultraviolet spectrophotometer: Agilent 1260 Infinity equipped with diode array detector (from Agilent)
column filler: Cadenza CD-C18 3 μm (from Imtact)
column tube: 3 mm in inner diameter and 100 mm in length
column temperature: 40° C.
Mobile phase A: acetonitrile (5 vol %) aqueous solution containing formic acid (0.05 vol %)
Mobile phase B: acetonitrile (95 vol %) aqueous solution containing formic acid (0.05 vol %)
Time chart:
 0.0→5.0 min, B %=30%
 5.0→8.0 min, B %=30%→50%
 8.0→10.0 min, B %=50%
 10.0→13.0 min, B %=50%→30%
 13.0→15.0 min, B %=30%
Flow rate: 0.2 mL/min
UV/Vis detected range of wavelength: 190 to 400 nm
Measured wavelength: 262 nm (4) Fish Eye The prepared EVOH resin pellets were fed to a 40 mm φ single screw extruder equipped with barrel, adapter and die all set at 210° C., to form into a film 30 μm thick. The film was evaluated with respect to fish eye.

The fish eyes having a diameter of 200 μm or more, a diameter of 100 to 190 μm, and diameter less than 100 μm per 100 $cm^2$ of the produced films (except films Nos. 1 and 2) were counted respectively by an inspection apparatus for film. Counting was conducted at 10 points per 50 m long in film. The average value of the 10 counted points were determined.

When it comes to the inspection apparatus for film, "FSA-100" (from OCS) for No. 1, "DT-300F" (from Disc Inspection Technology Co., Ltd.) for No. 2, and "TEC EYE" (from LINE SENSOR CAMERA EXCEL) for Nos. 3 to 6 were used respectively. We confirmed that either inspection apparatus was warranted for the same accuracy for inspection of fish eyes having the above-mentioned size.

<Production of EVOH Resin Pellet>

No. 1:

500 parts of vinyl acetate, 100 parts of methanol, 0.0585 part of acetyl peroxide (per vinyl acetate), and 0.015 part of citric acid (per vinyl acetate) were supplied in a polymerization vessel equipped with cooling coil. Air in the vessel was replaced with nitrogen gas and thereafter with ethylene. Subsequently blowing pressurized ethylene gas into the vessel up to 40 kg/cm$^2$ in the pressure of ethylene. Under the condition of pressurized ethylene gas, the polymerization was initiated by elevating the temperature to 67° C. with agitating the solution in the vessel. At the time that the rate of polymerization arrived at 60 wt %, i.e. 6 hours after the initiation, sorbic acid 0.0525 part (relative to the charged amount of vinyl acetate) was added to produce ethylene-vinyl acetate copolymer having an ethylene unit content rate of 32.5 mol %. The resulting solution containing the produced ethylene-vinyl acetate copolymer was fed into a distillation column and gaseous methanol was introduced from the bottom of the distillation column, thereby removing unreacted vinyl acetate and obtaining methanol solution of ethylene-vinyl acetate copolymer. Saponification was carried out by feeding methanol solution containing 0.007 equivalent weight of sodium hydroxide, as a result, a methanol solution having a concentration of 30 wt % EVOH resin and 70 wt % methanol. The resultant EVOH resin had a saponification degree of 99.7 mol %.

Thus obtained methanol solution of EVOH resin was extruded in a form of strand in a cooling water. The strand-shaped extrudate, which was hydrous porous body, was cut with cutter to obtain a porous pellet with 3.8 mm in diameter and 4 mm in length. The porous pellet contained EVOH resin in a concentration of 35 wt %.

The porous pellets was rinsed for 1 hour with a treatment liquid for rinsing. With respect to 100 parts of porous pellets, 300 parts of the treatment liquid for rinsing which contained sodium acetate 0.1 part, acetic acid 0.1 part, boric acid 0.003 part (in terms of boron), and sorbic acid 0.0008 part. The concentration of sorbic acid in the treatment liquid for rinsing was 2.7 ppm. Such rinsing operation was repeated five times. Next, thus rinsed porous pellet was dried at 110° C. for 8 hours in blowing nitrogen gas having oxygen content of 0.5 vol % or less. The resultant EVOH resin pellet contained 0.15 part of volatile matter, 0.06 part of sodium, and 0.015 part of boric acid (in terms of boron) with respect to 100 parts of EVOH resin. The EVOH resin pellet had MFR of 3.8 g/10 minutes (210° C., load of 2160 g). The resultant EVOH resin pellet, i.e. conjugated polyene-holding EVOH resin pellet, was evaluated with respect to amounts of conjugated polyene (TC and SC) and fish eye according to the evaluation method described earlier. The evaluation results are shown in Table 1.

No. 2:

The same manner of operation as No. 1 was conducted to produce a porous pellet of EVOH resin except that a composition of treatment liquid for rinsing the porous pellet of EVOH resin was changed. The composition of the treatment liquid for rinsing contained 0.1 part of sodium acetate, 0.1 part of acetic acid, and 0.003 part of boric acid (in terms of boron) per 100 parts of porous pellets.

The obtained EVOH resin pellet was evaluated with respect to the amounts of conjugated polyene (TC and SC) and fish eye according to the evaluation method described earlier. The evaluation results are shown in Table 1.

Nos. 3 to 6:

The EVOH resin pellet having an increased amount of conjugated polyene was produced by spraying an aqueous solution having a concentration of sodium sorbate indicated in Table 1 against the surface of the EVOH resin pellet No. 1. The amounts of conjugated polyene (TC and SC) contained in the produced EVOH resin pellet were indicated in Table 1. The produced EVOH resin pellet was evaluated with respect to fish eye. The evaluation results are shown in Table 1.

TABLE 1

| | | No. | | | | | |
|---|---|---|---|---|---|---|---|
| | | 1 | 2 | 3 | 4 | 5 | 6 |
| Treatment for holding conjugated polyene | Amount of sorbic acid added in polymerization (part/100 parts of vinyl acetate) | 0.0525 | 0.0525 | 0.0525 | 0.0525 | 0.0525 | 0.0525 |
| | Amount of sorbic acid contained in 300 parts of rinsing liquid for pellets part/100 parts of pellets) | 0.0008 | 0 | 0.0008 | 0.0008 | 0.0008 | 0.0008 |
| | Amount of sodium sorbate in aqueous solution of sodium sorbate for spray (ppm) | — | — | 56 | 660 | 4000 | 56000 |
| EVOH resin pellet | Total amount of conjugated polyene (TC: ppm) | 150 | 150 | 280 | 280 | 300 | 570 |
| | Abundance of conjugated polyene in surface portion (SC: ppb) | 39 | 21 | 180 | 790 | 20000 | 290000 |
| | Rate of abundance of conjugated polyene in surface portion (SC/TC: wt %) | 0.026 | 0.014 | 0.064 | 0.28 | 6.7 | 51 |
| EVOH resin film | Fish eyes having 200 μm or more in diameter (count) | 0 | 2 | 0 | 0 | 0 | 0 |
| | Fish eyes having 100-190 μm in diameter (count) | 1 | 12 | 1 | 1 | 1 | 3 |
| | Fish eyes having less than 100 μm in diameter (count) | — | — | 1 | 1 | 1 | 11 |

It is understood from Table 1 that EVOH resin pellets Nos. 1 and 3-6, respective of which had 30 ppb or more of conjugated polyene in a surface portion (SC), achieved to suppress the occurrence of fish eye of 200 μm or more in diameter as well as minute fish eye less than 200 μm in diameter. On the other hand, EVOH resin pellet No. 2, which had a total amount (TC) of conjugated polyene almost equal to that of the above pellets but had less than 30 ppb in the amount (SC) contained in a surface portion, insufficiently suppressed the occurrence of fish eyes.

A rinsing operation with a rinsing liquid containing conjugated polyene (sorbic acid) could slightly increase the amount (SC) of conjugated polyene (sorbic acid) contained in a surface portion with almost no affecting the total amount (TC) of conjugated polyene as shown in No. 1. EVOH resin pellet No. 1 exhibited the production of the EVOH resin pellet having an amount contained in a surface portion (SC) adjusted to 30 ppb or more.

Nos. 3 to 6 exhibited that the increase of the amount (SC) of conjugated polyene (sorbic acid and sodium sorbate) in a surface portion (SC) without significant increase of the total amount (TC) of the conjugated polyene could be achieved by spraying the solution containing the conjugated polyene against the surface of pellet, which was not accompanied with troublesome operations. However, in the case of SC above 25000 ppb (25 ppm) and the ratio of SC to TC, (SC/TC) above 10 wt %, minute fish eye less than 200 μm in diameter tended to occur increasingly (No. 6).

INDUSTRIAL APPLICABILITY

The EVOH resin pellet of the invention could avoid the occurrence of fish eyes and therefore could provide a wrapping material capable of satisfying strict requirements for the appearance of film. Moreover, the inventive method for producing EVOH resin pellet can produce EVOH resin pellets utilizing the facilities for manufacturing in exist and merely changing the composition of rinsing liquid or treatment liquid for pellets, therefore being capable of producing the EVOH resin pellets of the invention without troublesome operations.

The invention claimed is:

1. A saponified ethylene-vinyl ester-based copolymer pellet comprising a saponified ethylene-vinyl ester-based copolymer and a conjugated polyene,
   wherein an amount (SC) of the conjugated polyene determined by a below method is 30 ppb or more:
      20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene; and
   wherein a ratio of the amount (SC) of the conjugated polyene to a total amount (TC) of the conjugated polyene contained in the saponified ethylene-vinyl ester-based copolymer pellet, SC/TC, is 0.015% by weight or more.

2. The saponified ethylene-vinyl ester-based copolymer pellet according to claim 1, wherein the total amount (TC) of conjugated polyene contained in the saponified ethylene-vinyl ester-based copolymer pellet is from 0.1 to 10000 ppm.

3. The saponified ethylene-vinyl ester-based copolymer pellet according to claim 1, wherein the conjugated polyene is at least one selected from the group consisting of sorbic acid, sorbic acid ester, and sorbic acid salt.

4. A method for producing a saponified ethylene-vinyl ester-based copolymer pellet comprising,
   contacting a saponified ethylene-vinyl ester-based copolymer pellet with a treatment liquid containing a conjugated polyene to obtain a saponified ethylene-vinyl ester-based copolymer pellet in which an amount (SC) of conjugated polyene is 30 ppb or more measured by a method below:
      20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene;
   wherein a ratio of the amount (SC) of the conjugated polyene to a total amount (TC) of the conjugated polyene contained in the saponified ethylene-vinyl ester-based copolymer pellet, SC/TC, is 0.015% by weight or more.

5. The producing method according to claim 4, wherein the saponified ethylene-vinyl ester-based copolymer pellet is a porous pellet.

6. The producing method according to claim 4, wherein the saponified ethylene-vinyl ester-based copolymer pellet is a pellet obtained by pelletizing an alcohol solution containing the ethylene-vinyl ester-based copolymer.

7. The producing method according to claim 4, further comprising adding a conjugated polyene as a polymerization inhibitor in production of ethylene-vinyl ester-based copolymer.

8. The producing method according to claim 4, wherein the treatment liquid contains at least one selected from the group consisting of boron compound, acetic acid, and acetate.

9. A method for reducing fish eye in a melt molded article comprising a saponified ethylene-vinyl ester-based copolymer comprising
   employing either a plurality of saponified ethylene-vinyl ester-based copolymer pellets or mixture of the saponified ethylene-vinyl ester-based copolymer pellet and an optional other thermoplastic resin pellet as a raw material for the melt-molded article,
   wherein an amount (SC) of a conjugated polyene in the saponified ethylene-vinyl ester-based copolymer pellet is 30 ppb or more measured by the below method:
      20 g of the saponified ethylene-vinyl ester-based copolymer pellets being agitated at room temperature for 10 minutes in 30 mL of liquid containing distilled water and methanol at a mix ratio of 1:1 in volume, and analyzing an amount of the extracted conjugated polyene; and
   wherein a ratio of the amount (SC) of the conjugated polyene to a total amount (TC) of the conjugated polyene contained in the saponified ethylene-vinyl ester-based copolymer pellet, SC/TC, is 0.015% by weight or more.

* * * * *